Jan. 12, 1932.  A. G. RAYBURN  1,840,872
POWER TRANSMISSION
Filed July 20, 1926   8 Sheets-Sheet 1

Inventor
Alden G. Rayburn
William A. Strauch
By
Attorney

Jan. 12, 1932.  A. G. RAYBURN  1,840,872
POWER TRANSMISSION
Filed July 20, 1926   8 Sheets-Sheet 2

Inventor
Alden G. Rayburn
By William A. Strauch
Attorney

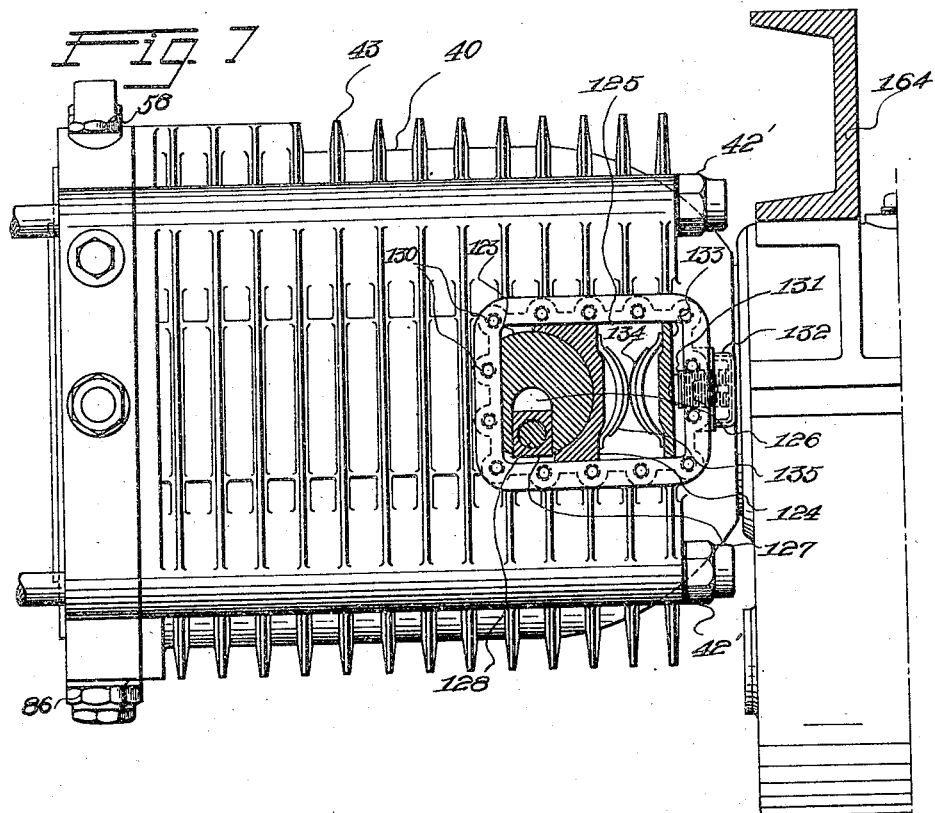
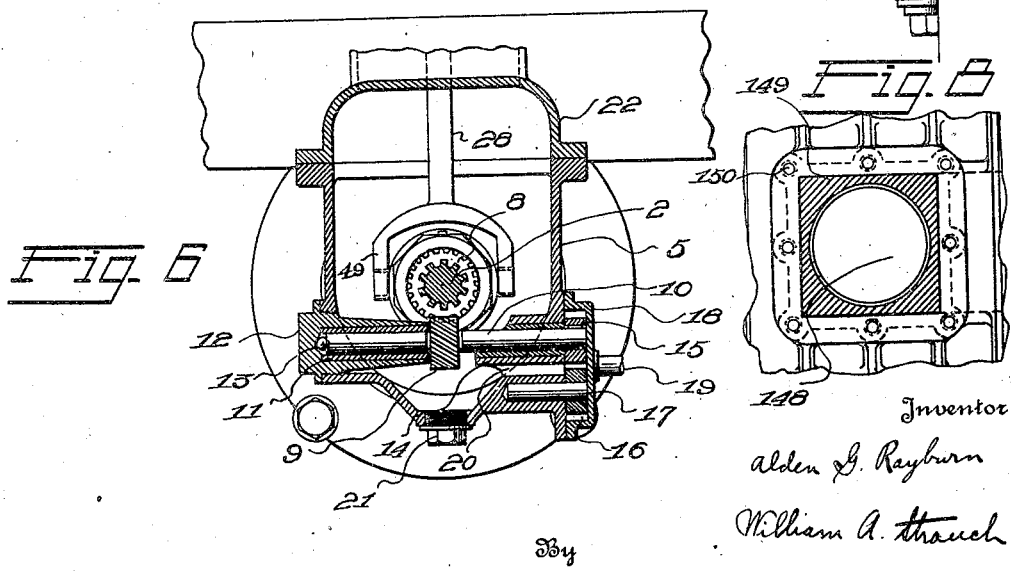

Jan. 12, 1932.  A. G. RAYBURN  1,840,872
POWER TRANSMISSION
Filed July 20, 1926   8 Sheets-Sheet 5
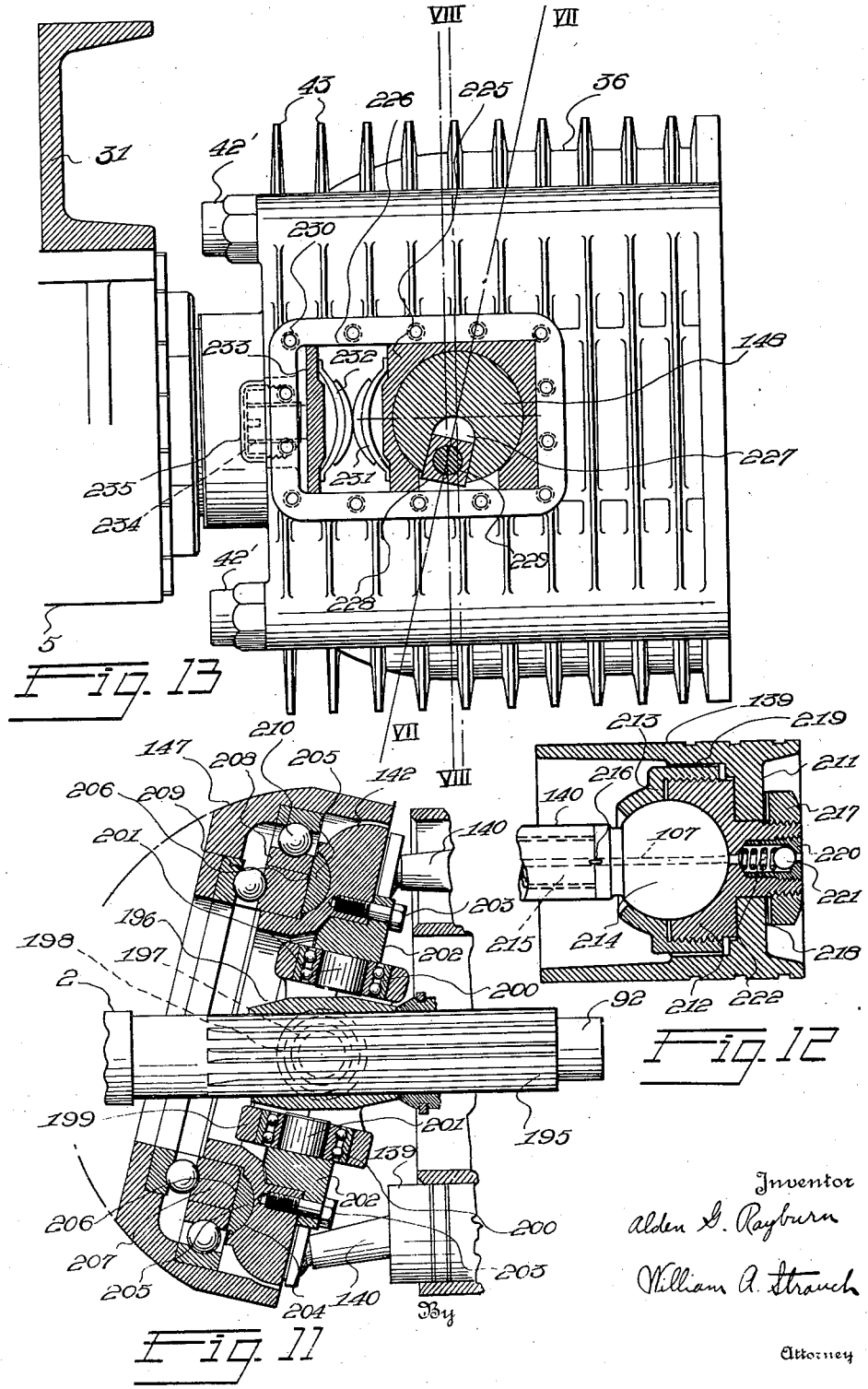

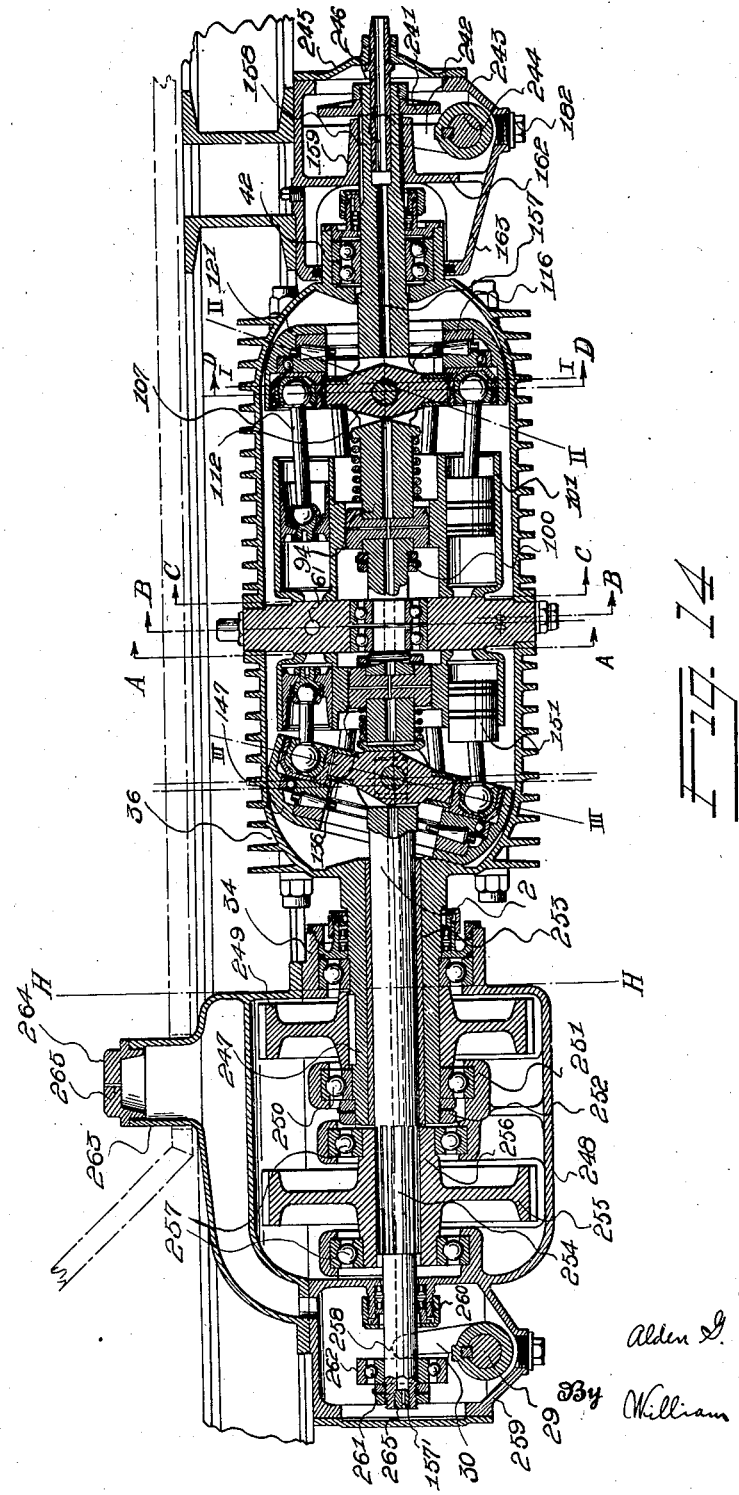

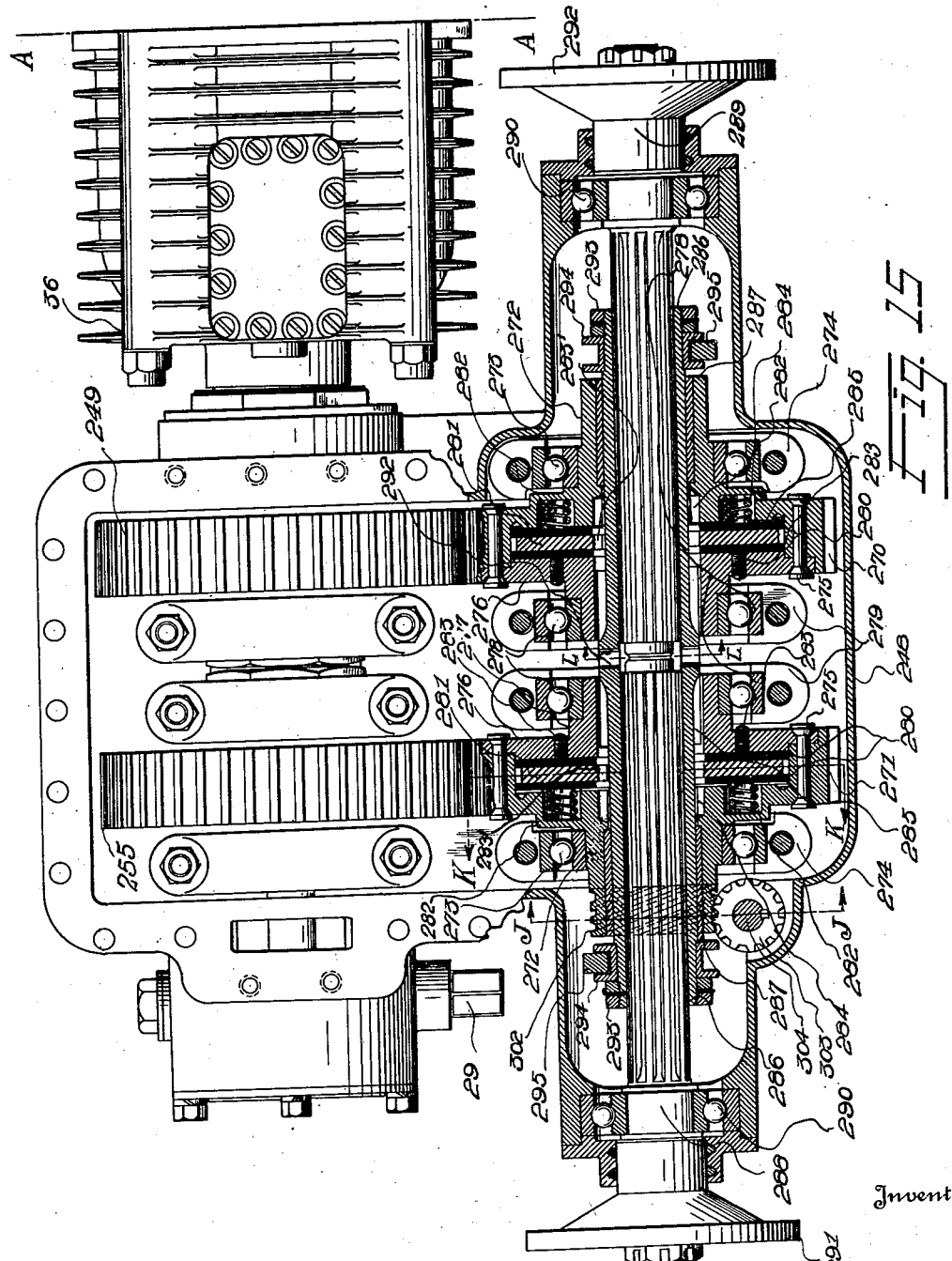

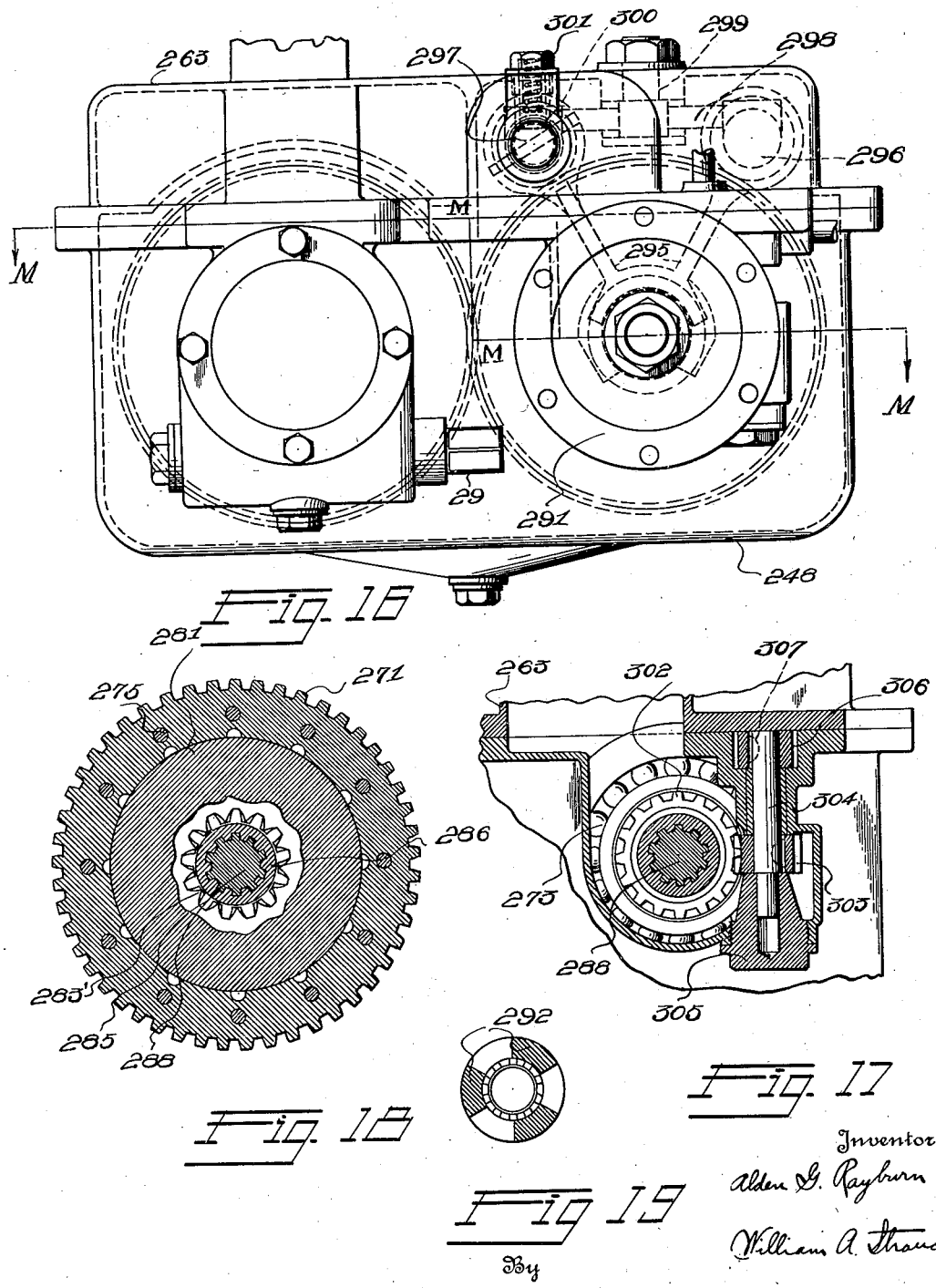

Patented Jan. 12, 1932

1,840,872

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMISSION

Application filed July 20, 1926. Serial No. 123,701.

The present invention relates to power transmissions, and more particularly improvements in torque multiplying and speed varying fluid actuated transmissions.

A primary object of the invention is to provide an improved variable speed torque multiplying hydraulic transmission with a hydraulic motor in which the motor cylinders are stationary and in which the maximum fluid flow occurs with the parts arranged for maximum torque multiplication while the fluid comes to rest when the torque multiplication is minimum.

Another object of the invention is to provide novel pressure operated automatic controls for variable pump and motor units especially designed for use in hydraulic power transmissions, but useful in various other relations.

Still another object of the invention is to provide novel gearing for hydraulic, electric, or mechanical speed varying and torque multiplying power transmissions arranged in such manner that when the prime mover can handle the load on the tail shaft without torque multiplication the torque multiplying mechanisms or transmission unit may be completely disconnected from the system and a direct mechanical connection provided between the driving and the driven shaft member so that the torque multiplying and speed varying mechanisms may be brought to rest when no occasion for their use exists; and when the torque demands on the tail shaft exceed that which can be delivered by the prime mover, the torque multiplying mechanisms may be connected into the system without arresting rotation of the driving and driven shaft and without subjecting the mechanisms to undue shocks or blows.

Other objects of the invention are to provide novel means for avoiding the formation of emulsion and eliminating air from the fluid circulating system of a hydraulic transmission; to provide novel means for insuring picking up of the fluid by the pumping unit under all conditions of operation; and to provide novel cooling arrangements for the fluid in hydraulic or fluid operated power transmissions.

Further objects of the invention are such as may be attained by a utilization of the various combinations, sub-combinations, and principles in the various relations to which they may be obviously adapted without departing from the spirit of the present invention as set forth in the appended claims.

As shown in the drawings:

Figure 6 is a sectional view taken along line F—F of Figure 1.

Figure 7 is an external side elevation partially in section showing the automatic control arrangement for the motor unit.

Figure 8 is a fragmental view showing the pump trunnion supports.

Figure 11 is a fragmental sectional view showing a modified form of backing plate and angle box construction.

Figure 12 is a detailed sectional view showing a preferred form of piston construction as used with the invention.

Figure 13 is a side elevation partially in section of a modified pump control.

Figure 14 is a sectional elevation of a modified form of the invention.

Figure 15 is a plan view partially in section along line M—M of Figure 16 showing an improved gearing arrangement for connecting the torque multiplying mechanisms between a driving and driven shaft.

Figure 16 is an end view of the form of invention shown in Figure 15.

Figure 17 is a sectional view taken along line J—J of Figure 15.

Figure 18 is a sectional view taken along line K—K of Figure 15.

Figure 19 is a detailed sectional view taken along line L—L of Figure 15.

Figure 1:
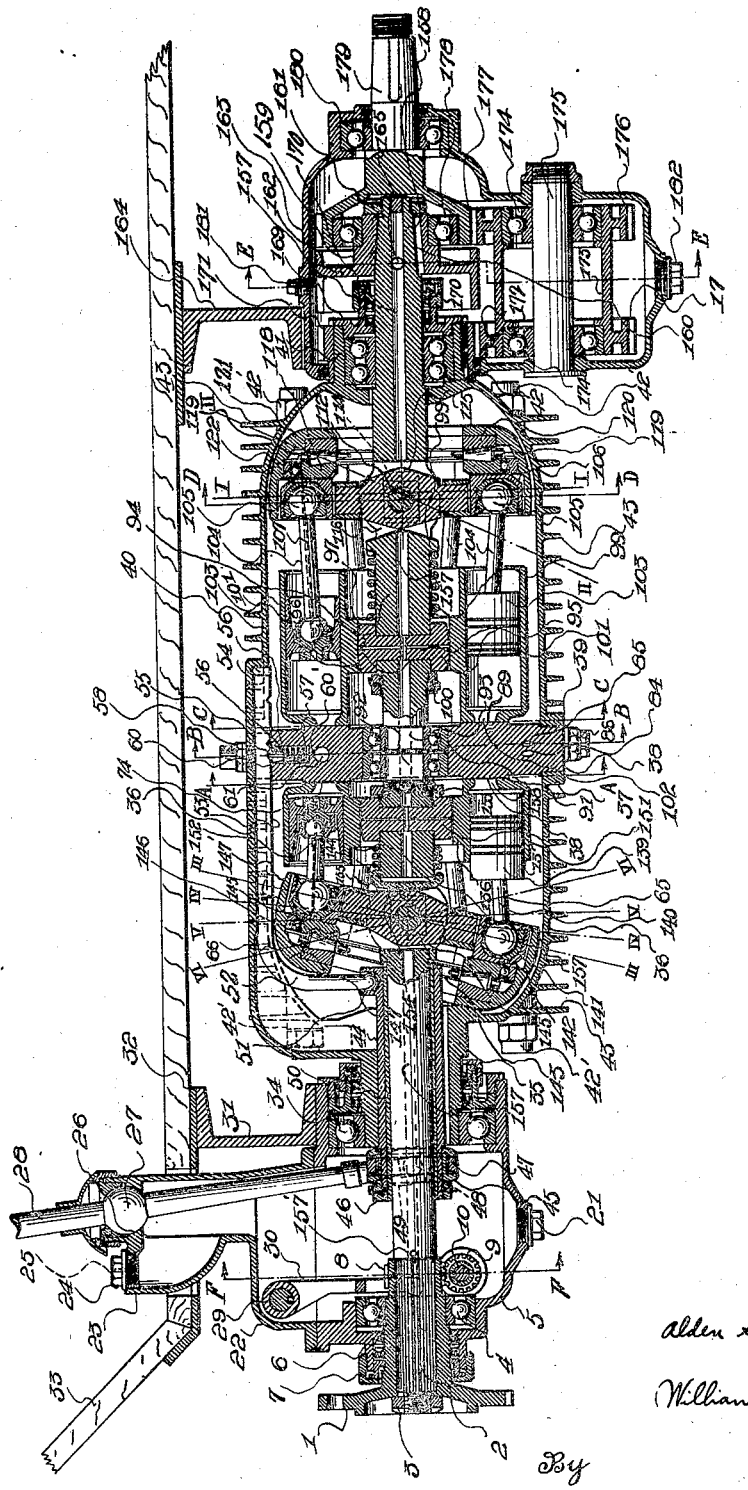
Figure 1 is a vertical sectional view through a preferred embodiment of the invention.

Referring to Figure 1, my improved transmission unit comprises a coupling member 1 adapted to be coupled to a suitable prime mover, for example an internal combustion engine. Member 1 is splined to and held in position on the end of driving shaft section 2 by means of a suitable securing nut 3, and is journaled for rotation in anti-friction bearing 4, which in turn is slidably supported in a recess formed in the casing and fluid reservoir or tank section 5. To prevent fluid leakage from the reservoir around the coupling member 1, a suitable packing 6 is provided which is held in position in the gland 7. Formed integrally with the inner end of the coupling member 1 is spiral driving gear 8 (Figures 1 and 6) which meshes with and drives a spiral pinion 9. Pinion 9 is rigidly secured to and drives a spindle 10, one end of which is journaled in the bushing 11 secured in a bearing member 12 which in turn is threaded into the case section 5. A suitable thrust bearing 13 is provided between the end of the spindle 10 and the bearing member 12 to resist the end thrust of spindle 10 without creating an undue amount of friction. The opposite end of the spindle 10 is journaled in and projects through bushing 14 secured in a projection of the casing 5. Secured to and driven by the projecting end of spindle 10 is a pump gear 15 which meshes with a pump gear 16. Pump gear 16 is bearinged and supported on the spindle 17 which is permanently journaled in casing section 5, and a pump housing 18 is bolted in position over the pump gears 15 and 16. Secured to the high pressure side of pump gears 15 and 16 is a conduit 19. Fluid from the interior of the casing section 5 is drawn from the reservoir 5 by gears 15 and 16 through conduit 20, and is forced through conduit 19 to the transmission casing, maintaining the low pressure or suction side of the transmission proper under a predetermined positive pressure as will more fully hereinafter appear.

Casing section 5 is provided at its bottom with a suitable drain plug 21 and secured at its top by means of suitable bolts or studs is a top section 22. Section 22 is provided with a filling extension 23 and a filling plug 24 in which an air outlet opening 25 for escape of air entrained in the fluid is provided. Seated in a spherical seat 26 of the top section 22 is ball member 27 of a shift or control lever 28. Journaled in suitable bearings in the top section 22 and extending outward therefrom is a clutch operating shaft 29 to which the upper end of a clutch operating arm 30 is keyed. The lower end of arm 30 is bifurcated and the bifurcated ends rest against the races of the slidably supported bearing 4 and actuation of arm 30 will shift bearing 4, shaft section 2, and coupling member 1 to the left in Figure 1. Shaft 29 may be actuated by any suitable control mechanism external to the casing section 22 such for example as the clutch pedal of an automobile. Casing 5 is secured to and supported by a frame channel 31 which in turn is secured to a suitable supporting frame work. Supported on the top flange of the frame channel 31 is a plate 32 on which the flooring 33, which may be the flooring of a motor vehicle, is supported.

Supported in an extension of the casing section 5 is an anti-friction or ball bearing 34 in which the end of a tubular extension 35 of transmission casing section 36 is rotatably supported. The casing section 36 is fastened by means of flange 37 and suitable studs or bolts to a distributing or valve plate 38. Secured to the opposite side of the plate 38 is a flange 39 of a casing section 40 which is provided with a tubular extension 41 supported by the outer race of a ball or anti-friction bearing 42. The casing sections 36 and 40 are further secured together as a unitary structure by through bolts 42' and are provided with the heat radiating fins 43.

Tubular extensions 35 of the casing section 36 is slidably keyed to and drives a sleeve member 44 to the forward end of which a shifting collar member 45 is tightly secured by means of the threaded securing collars 46. Resting in a suitable groove formed externally in shifting collar 45 is a stationary shift ring 47 provided with trunnions 48 which are engaged by the bifurcated ends 49 of the shift lever 28. Secured in the sleeve 44 is a bushing 50 in which the drive shaft section 2 is rotatably and slidably journaled. Secured in a seat 51 of the sleeve 44 is the ball end of a shift, locking and actuating rod 52 provided with a horizontal extension 53 which is slidably seated in grooves 54 formed in the casing sections 36 and 40 and passes through a guiding opening in the valve plate 38. Formed in the lower side of the extension 53 are the locking and locating notches 55 in which the V-shaped or conical shaped end of a locking plunger 56 is adapted to be registered. Plunger 56 is slidably supported in a recess 57 formed in the valve plate 38 and a helical spring 60 normally urges the plunger 56 outward. The outer end of recess 57 is closed by a plug 58 and at the bottom it is connected by a passage 60' to a conduit 61 (Figures 1 and 2).

Figures 2, 3:
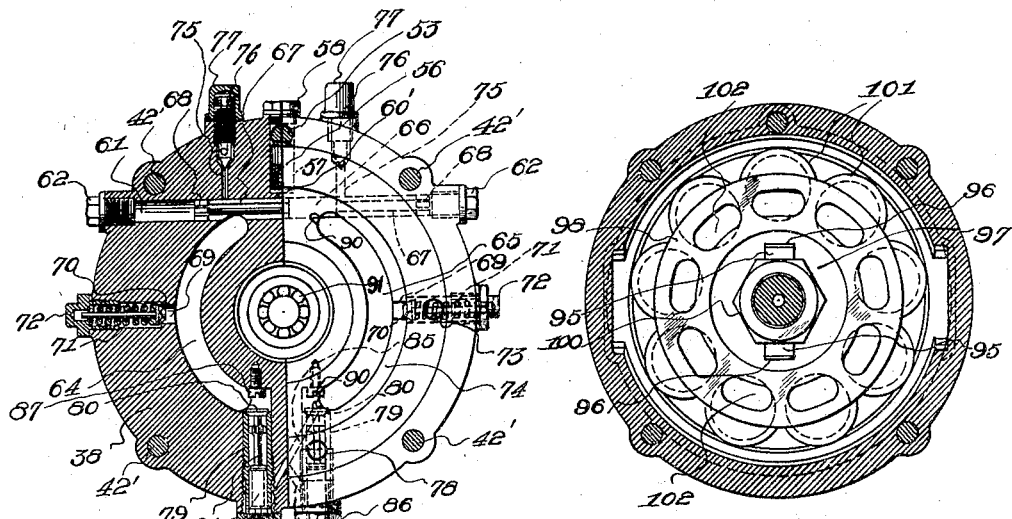
Figure 2 is a sectional view, the right half of which is taken along the plane A—A of Figure 1, and the left half of which is taken along the plane B—B of Figure 1.
Figure 3 is a sectional view taken along plane C—C of Figure 1.

As shown in Figure 2 the ends of conduit 61 are closed by screw plugs 62. Fluid timing ports 64 and 65 formed through the valve plate 38 communicate with conduit 61 and slidably supported in this conduit is a piston valve 66 provided with extensions 67 to which the guiding members 68 are secured. In operation, with high pressure fluid in port 64 and low pressure fluid in port 65, valve 66 will be in the position shown and high pressure fluid will enter conduit 61 and passage 60' to recess 57 forcing the plunger 56 outward against extension 53 of the actuating member 52, locking actuating member 52 against movement. When 64 is the low pressure port and 65 the high pressure port, valve 66 is forced to the left in Figure 2 cutting off fluid flow from port 64 to passage 60' and high pressure fluid passes from port 65 through passage 60 to the recess 57 forcing the plunger 56 into locking engagement with extension 53. In this way it will be seen that a locking device controlled by the fluid pressure is provided for the extension 53 which whenever fluid pressure is developed in the system functions to lock extension 53 against movement, and in order to shift lever 28, the pressure in the system must be released naturally or by declutching as will more fully hereinafter appear.

Formed in the valve plate 38 and communicating with the ports 64 and 65 are diametrically opposite pressure relief passages 69 in which the conical relief valves 70 are provided. Relief valves 70 are held against conical seats normally closing the relief openings by means of helical springs 71 which abut against caps 72 screwed in position in the outer ends of passages 69. Relief passages 69 are connected to the relief outlets 73 which communicate with the space in the interior of the casing section 36, surrounding the pumping unit at points outside of the pump timing face 74 of the valve member 38. When sufficient pressure is developed in either the port 64 or 65 to unseat the corresponding valve 70, fluid will pass outward from ports 64 or 65 to the space in the casing section 36 surrounding the pump. Formed in valve plate 38 and communicating with the conduits 61 are the air outlet passages 75 in which needle relief valves 76 are threaded. Valves 76 are provided with suitable openings through which air may escape to atmosphere during the initial filling of the transmission with fluid. Sealing caps 77 are threaded on valves 76 and removable when air is to be removed from the system.

A pair of intake passages 78 are formed in valve member 38 which communicate with the interior of the cylindrical valve sleeves 79, the inner ends of which communicate with the ports 64 and 65 respectively. Valve members 80 adapted to seat in the ends of sleeves 79 are provided to seal ports 64 and 65 when high pressure fluid is passing through the corresponding ports. Valve members 80 are secured to the operating rods 81 which at their outer ends are secured to actuating pistons 82 slidably supported with a liquid tight fit in sleeves 79. The sleeves 79 are threaded in the valve plate 38 and are provided with the relieved end sections which form chambers 83, for the passage of operating fluid from the ports 64 and 65 into conduits 84 and 85 respectively through suitable inlet openings in the ends of the sleeves 79 adjacent the ends of the pistons 82. Threaded on the projecting ends of valve sleeves 79 are the sealing caps 86 which close the ends of the sleeves and the fluid chambers 83. Suitable stops 87 are provided to limit the inward movement of the valves 80 under the influence of fluid pressure on the system. In operation, as will more fully hereinafter appear, valve plate 38 is rotated so that the centrifugal force normally tends to close valves 80, thus aiding in the firm seating thereof in closed position without the necessity of resorting to springs. When high pressure fluid is developed in port 64, port 65 is connected to the suction side of the pump unit. Fluid under pressure from port 64 passes through conduit 84 into chamber 83 and then through the openings in the sleeve 79, back of piston 82, forcing the piston 82 inward against the action of centrifugal force and unseating valve 80 individual to port 65 connecting port 65 with its intake port 78 so that the amount of fluid in the circulating system may vary with the requirements. When the fluid pressures are reversed and the port 65 becomes the high pressure port, the pressure and the action of centrifugal force will close valve 80 individual thereto cutting it off from the intake conduit 78, and at the same time fluid under pressure will pass from port 65 through conduit 85 back of the piston 82 controlling the valve 80 individual to the port 64. This will unseat the valve 80 connecting the corresponding intake opening 78 with port 64. In this way it will be seen that positively operated control valves are provided which automatically cut off the intake openings on the high pressure side and positively open the low pressure port in the valve 38 to permit the intake or egress of fluid in the circulating system as the case may be, independently of the action of centrifugal force. It is also to be noted that all connections from the circulating system to the fluid in the casing are on the pump side for reasons that will more fully hereinafter appear.

Provided in the valve face 74 for the pumping unit and in the valve face 89 of the valve member 38 for the motor unit are the relief notches 90 to prevent fluid hammer due to sudden opening and closing off of the ports of the motor and pump units. Supported in the center of the valve member 38 are the anti-friction bearings 91 in which the end sections 92 and 93 of the drive shaft 2 and stationary motor supporting shaft or member 94 are supported. Secured in the stationary shaft 94 are the key members 95 the heads of which fit slidably into keyways 96

Figure 4:
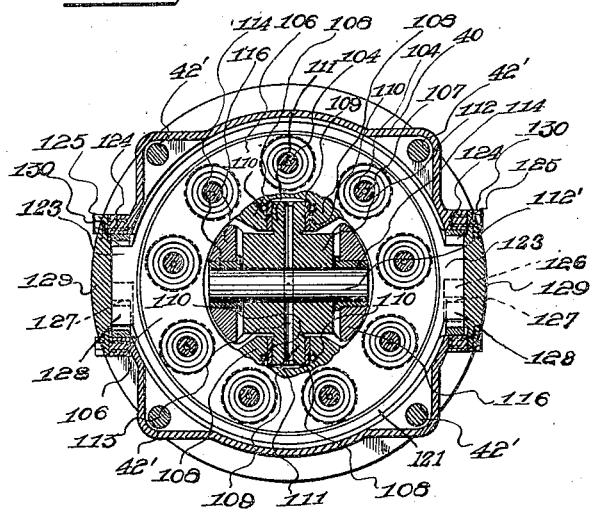
Figure 4 is a sectional view taken along plane D—D of Figure 1.

(Figures 1 and 3) of the motor cylinder block 97, and the bodies of which preferably are cylindrical and thus rotatable about their axes within the shaft. The ends of key members 95 are shaped so that movement of the cylinder block 97 is permitted thereon to permit the seating of the valve face 98 (Figure 3) on the motor timing face 89 of the valve member 38. Valve face 98 of the cylinder block 97 is held against the face 89 of valve member 38 by means of a helical spring 99 interposed between the cylinder block and a shoulder formed on the stationary member 94, and a locked securing nut 100 is provided by means of which the cylinder block and spring 99 are held in assembled relation on the stationary member 94. Formed in the cylinder block 97 is an odd number of cylinders 101 provided with the ports 102 which connect the interior of the cylinders with the valve face 98 of the cylinder block and through which fluid is admitted into the cylinders. Slidably supported in the cylinders 101 are the reciprocating pistons 103 in which ball ends of the piston rods 104 are seated. The opposite ends of the piston rods 104 are provided with ball ends 105 which are secured in suitable spherical seats formed in the ring member 106. Formed centrally in the piston rods 104 are lubricating conduits 107 which communicate through conduits in pistons 103 with the interior of the cylinders 101. In operation of the motor, fluid under pressure is forced outward through these conduits lubricating the ball seats in pistons 103 and in ring 106. Formed in the ring 106 (Figure 4) are the pairs of diametrically opposite parallel projections 108 in which the rectangular bearing boxes 109 are keyed by means of screws 110. Journalled in the bearing boxes 109 are the trunnions 111 of a universal drive member 112. Rigidly secured in the drive member 112 and disposed at right angles to the axis of the trunnions 111 is a trunnion member 112' held against inadvertent movement by the pin 113. The ends of the trunnion member 112' extend into and are journaled in bearing blocks 114 which are slidably supported in the guide openings 115 (Figure 1) formed in the yoke section 116 of the stationary motor supporting member 94. It will be seen that the ring 106 is supported from member 94 by a heavy universal joint which permits a limited sliding movement with relation to the stationary member. As shown in Figure 1, the ring 106 rests against a plate 118 which is bearinged against conical rollers 119 of a roller bearing 120, which in turn is rigidly secured in the motor angle or backing plate or box 121. Supported in the angle plate or box 121 is a ball bearing 122 for the plate 118. The angle plate or box 121 is provided with trunnions 123 which rest in the semi-circular seats or bearing surfaces of the blocks 124 (Figures 4 and 7) which in turn are slidably supported in the guide ways or openings 125 of the casing section 40. Formed in the end of each trunnion 123 are the actuating slots 126 in which the bearing blocks 127 are slidably supported. The blocks 127 are journaled on the pins 128 which in turn are formed integrally with or are rigidly secured to the caps 129 for the openings 125. Caps 129 are secured in position over the openings 125 by means of the studs or cap screws 130. Threaded in suitable bosses of the casing section 40 and extending into the openings 125 are the adjusting screws 131 over the projecting ends of which the removable protecting caps 132 are secured. Abutting against the end of the screws 131 are the plates or members 133 against which the ends of the arched leaf springs 134 abut. Resting against the center of the spring 134 is the central arched portion of a leaf spring 135, the ends of which abut against the edges of trunnion backing blocks 124.

The pumping unit comprises a cylinder block 136 similar to motor block 97, provided with an odd number of cylinders 137 with ports 138 for the admission of fluid to the cylinders which are timed by face 74 of the valve member 38. Slidably supported in the pump cylinders are the reciprocating pistons 139 in which the ball ends of piston rods 140, the same in construction as the motor piston rods are seated. The opposite ends of piston rods 140 are mounted in ball seats 141 in the ring 142. Ring 142 is similar in construction to the construction of the motor ring 106 and is connected by a universal joint of the same construction as described in connection with the motor unit, to the sliding trunnions blocks 143, slidably supported in slots 144 of yoke 145, formed integrally with and connecting driving shaft 2 with shaft section 152. Ring 142 is supported against a plate 146 and the latter by means of roller and ball bearings from the pump angle plate or box 147, similar in construction to the motor angle plate or box 141 and connected by means of projection 147' to extension 53 of actuating member 52. Angle plate or box 147 is provided with trunnions 148 (Figure 8) which are journaled in boxes 149 in turn supported in suitable openings in the casing section 36, which openings are provided with cover plates (not shown), and held in place by the cap screws 150.

Pump cylinder block 136 is supported on the key members 151 in a manner permitting a seating movement of the block. Key members 151 are bearinged in and are secured with a section 152 formed integrally with yoke 145 and end 92 of driving shaft 2. Secured on section 152 and locked in position is a collar 153 which holds the pump unit in assembled relation on the drive shaft section 152. A helical spring 154 is interposed between the cylinder block 136 and sliding key member 155 and normally maintains the cylinder block 136 with the valve face thereof against the timing face 74 of the valve member 38, and forces the key member 155 against the universal drive member of the pump unit to the left in Figure 1 until the trunnion blocks 143 engage the left edges of the openings 144 in yoke 145 of the drive shaft section 2. It is to be noted that when the parts are in assembled relation a slight clearance exists between the collar 153 and the cylinder block 136 for a purpose which will more fully hereinafter appear in the detailed description of the operation of the device. Formed centrally through the drive shaft sections 2, 152 and 92, and through the stationary shaft sections 93 and 94 is a fluid passage or conduit 157 from which lubricating ducts may be provided in the keyed members 95 and 151, and through which a continual flow of fluid is maintained out of a fixed orifice 157' into reservoir 5 as will more fully hereinafter appear.

Figure 5:
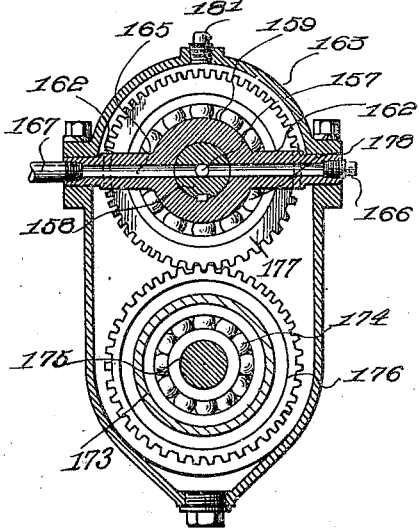
Figure 5 is a sectional view taken along line E—E of Figure 1.
Figure 9:
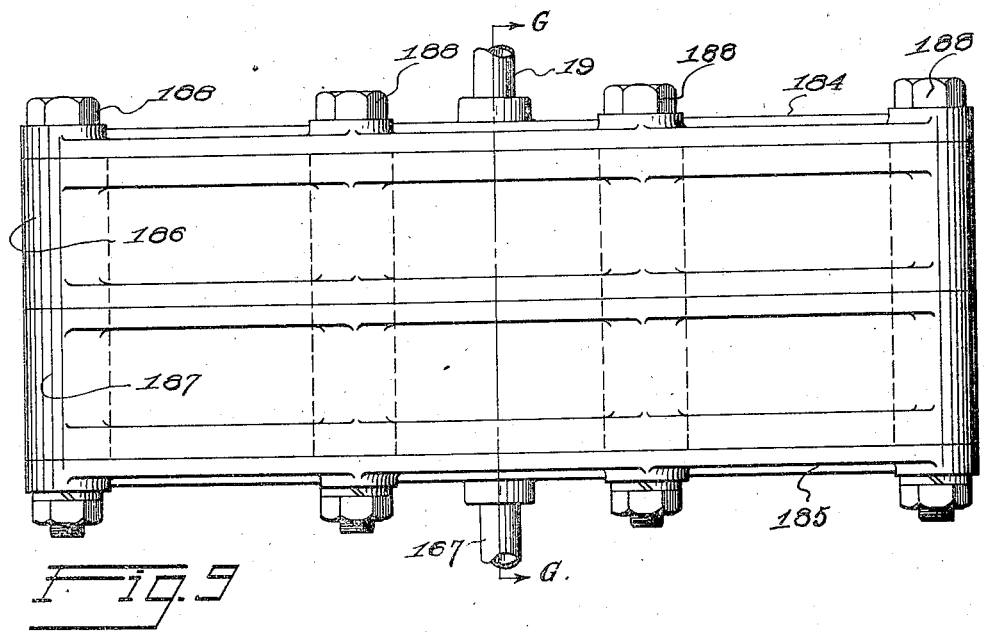
Figure 9 is a side elevation of a preferred form of oil filter and cooler utilized with the invention.
Figure 10:
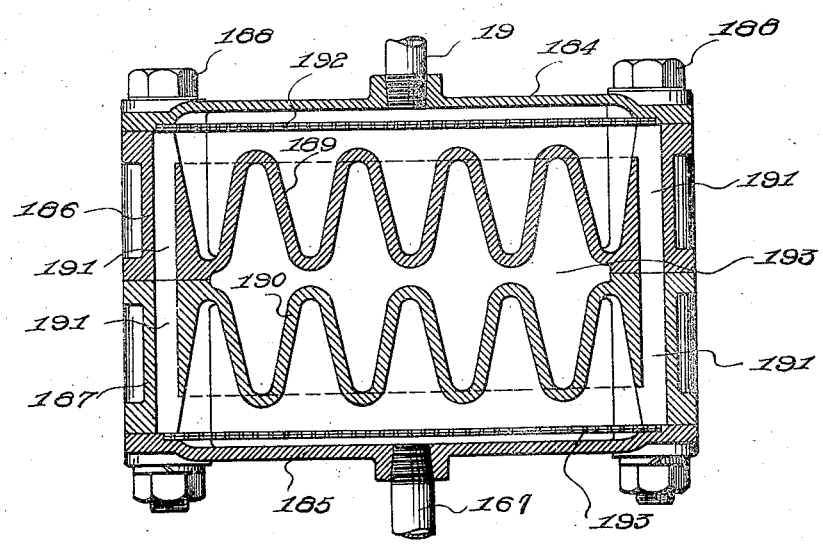
Figure 10 is a sectional view taken along line G—G of Figure 9.

The outer end of the stationary motor shaft section 94 is provided with a conical extension 158 which is rigidly keyed in and secured to a stationary seat 159 by means of the key 160 and the lock nuts 161. The seat 159 is connected (Figures 1 and 5) by the supporting structure 162 to a stationary casing 163 supported from the frame channel member 164. Formed in the supporting structure 162 is a conduit 165 which at its one end is closed by a plug 166 and at its other end is connected to a conduit 167 which is connected either directly or through a suitable filter and cooling device to conduit 19 of the gear pump in the storage reservoir 5.

The inner race of bearing 42 for the casing section 40 is supported on the stationary shaft section 94 of the motor unit and is held in position by means of a cap 169 provided with a packing gland structure 170 to prevent substantial leakage of oil from the casing section 40 through the bearing 42 into the casing 163. Rigidly secured to and rotatable with the casing section 40 and disposed in the gear casing 163 is a driving gear 171 which meshes with and drives a gear 172 formed integrally with a sleeve 173 supported by means of the anti-friction bearing 174 from a spindle 175 secured in the casing 163. Formed integrally with the sleeve 173 is a spur gear 176 which meshes with a gear 177 supported by means of the roller bearing 178 supported on stationary seat 159. Formed integrally with gear 177 is a tail shaft section 179 which is supported in the bearing 180 and extends out through the casing section 163. Suitable filling and drain plugs 181 and 182 may be provided in the casing section 163 so that if desired the gears in casing section 163 may be operated in oil. With this arrangement of gearing the driving shaft section 2 and the tail shaft section 179 are in actual alignment. However, power may obviously be taken from casing section 40 through any suitable gearing arrangement.

In the preferred arrangement of the invention, provision is preferably made for cooling and filtration of the fluid. In such cases pipes 19 and 167 leading from the gear pump in the casing 5 are preferably connected to end plates 184 and 185 of a cooling and filtering unit. Plates 184 and 185 are preferably of aluminum and are clamped in position against the cast aluminum filter sections 186 and 187 by means of the securing bolts 188. The sections 186 and 187 are constructed with corrugated walls 189 and 190 around the ends of which the spaces 191 for the passage of fluid are provided. Secured between the plates 184 and 185 and the sections 186 and 187 are suitable filtering screens or cloths 192 and 193. As shown, with the parts clamped in assembled relation, a filtering and cooling device is provided of which the capacity may be increased by inserting units built up of the sections 186 and 187. Sections 186 and 187 when clamped together provide a cooling space 193 for the passage of air or cooling water as desired, between the outer surfaces of the corrugated sides 189 and 190. In this way convenient filtering and cooling units arranged to withstand substantial internal oil pressures are provided. In operation, fluid under pressure is forced from the gear pump in casing section 5 through the conduit 19 under a pressure depending upon the speed of rotation of shaft 2 and is forced through the filter screen 192. The fluid is cooled as it flows around the cooling space, and it finally passes through the filter screen 193 to pipe 167 under pressure.

In Figure 11 there is illustrated a modified form of backing plate and universal joint construction which as shown is applied to the pump unit of the form of invention so far described, but is obviously applicable to the motor unit. As shown, the drive shaft sections 2 and 92 are integrally connected with a splined shaft section 195 upon which a central drive member 196 is slidably keyed. Drive member 196 is provided with diametrically opposite trunnions 197 which are supported by anti-friction or ball bearings 198 which in turn are supported in ring 199. Ring 199 is built up of two annular halves which are bolted together, and supported therein with their axes at right angles to the axes of bearings 198 are the anti-friction or ball bearings 200 in which the diametrically opposite and axially aligned trunnions 201 of the universal ring 202 are supported. For convenience in machining trunnions 201 the ring 202 is formed in halves and the halves are bolted by means of the cap screws or bolts 203 to the ring 142 of the pumping unit. Formed in ring 142 are annular segmental recesses 204 in which equalizing members 205 are seated. Equalizing members 205 are provided with outer flat surfaces 206 which rest against the curved edges of the races 207 and 208 of the thrust and radial anti-friction or ball bearings 209 and 210 in turn supported in suitable seats formed in the angle box or backing plate 147. In operation of this form of universal joint, pressure on the bearing ring 142 is transmitted through equalizing members 205 to the races 207 and 208 of the thrust and radial bearings 209 and 210, so that thrust on the plate is transmitted to and resisted by both the bearings 209 and 210, forming an improved universal construction.

A preferred form of piston construction for the motor and pump units is shown in Figure 12, in which piston 139 is preferably of relatively soft material, and is provided in rear wall 211 with a seat and central opening adapted to receive the ball seat 212. Seat 212 is preferably of hard bearing metal and is externally threaded to receive the hard metal bearing cap 213 forming a spherical seat for ball end 214 of the piston rod 140. In assembling the units the ball end 214 is seated in member 212 and the cap 213 is screwed in position until the ball end is firmly seated. The end of the tubular rod 140 is threaded tightly on an extension 215 of the ball member 214 and when in proper position is locked against turning by a locking pin or by deforming the metal at the joint of the tubular member 40 and the ball member 214 as by a chisel impression 216. The sub-assembly of the piston rod and its seat is secured in position in the piston by means of a nut 217 and a suitable lock washer 218. To prevent the cap 213 from turning in operation, it is preferably provided with a fluted or scored external section 219 which is so constructed that as the sub-assembly is drawn into position by tightening nut 217, the scored or fluted section of the cap 213 will cut into the relatively soft metal of the piston 139 effectually resisting a tendency for the cap 213 to turn in operation.

While my improved piston construction is designed for use in the form of the invention heretofore described in which the casing surrounding the hydraulic motor or pump unit is filled with operating fluid, it is also adaptable for use in various other relations in which the unit is surrounded by air. In such cases as the balls 214 wear in their seats, or due to imperfect adjustment, a slight unseating movement may develop which will act to permit air to enter between the ball and its seat on a return stroke of the piston. This air, during the forward stroke of the piston may be forced into the fluid circulating system. In such cases the conduit 107 for lubricating the ball seats of the pistons preferably terminates in a check valve 220 provided with a ball 221 held in position by a spring 222, the parts of the check valve 220 being so proportioned and arranged that the ball 221 will seat whenever a tendency to force air into the circulating system through the lubricating conduit 107 develops. By this arrangement effective lubrication of the piston ball seats may be secured by fluid forced under pressure through lubricating conduit 107 from the interior of the cylinders, while the forcing of air into the system due to imperfect seating of the ball ends of the piston rods is eliminated.

In operation of the form of invention so far described the mechanism is initially filled with as much oil as possible through suitable filling caps (not shown) provided in the casing sections 36 and 40 in substantial alignment with caps 77. Caps 86 may be removed and blocks inserted to hold valves 80 open and caps 86 are then replaced. Caps 77 are turned to their highest position and are removed to permit the escape of air from needle valves 76. Fluid is then poured into the casing sections filling the unit as much as possible in this way. As the space is filled up with fluid a substantial portion of the air will escape through valves 76 and the filling openings, and the fluid will flow through the openings 78 into ports 64 and 65 and the motor and pump pistons. After as much fluid as possible has been filled into the unit in this way, the caps may be replaced and the unit turned over by hand, the caps again removed and further fluid filled into the unit by hand. After the hand filing is completed as far as possible, the blocks are removed from valves 80 and the caps are replaced. Pump backing box 147 is then placed in its position of maximum angularity as shown in Figure 1, plug 24 is removed, and fluid is poured into the storage reservoir 5. Initial filling of the unit as above set forth will provide ample lubricant for the mechanism, but a susbtantial quantity of air will still be trapped in the various passages of the transmission. A load greater than that which can be handled by the prime mover directly is applied to driven shaft 179 and shaft 2 is then driven operating the pump gears 15 and 16 (Figure 6) and forcing liquid through pipe 19 into the filtration and cooling unit from which the fluid passes through pipe 167 under pressure into the conduit 165 and the central conduit 157 of the stationary motor supporting member 94. As the shaft 2 rotates the pump cylinder block 136, ring 142 will be rotated with the drive shaft 2. Due to the angularity of box 147, rotation of ring 142 will tend to reciprocate pump pistons 139 and the reaction of ring 142 on box 147 will tend to rotate casing sections 36 and 40 together with valve member 38. Fluid pressure will be developed in port 64 and the valve 80 individual to the port 65 will open permitting fluid to be sucked into the circulating system from casing section 36 through the opening 78, while valve 80 individual to port 64 will close. As the pressure is developed in the port 64 high pressure fluid is forced into the motor cylinders 101 in communication with the port 64. As a result of the pressure on motor pistons 103 pressure will be transmitted to the piston rods 104 and ring 106 causing the angle box 121 to force the blocks 124 to the right in Figure 7 and deflecting the springs 134 and 135 which are of such strength as to be deflected only when the resistance to the tail shaft movement is greater than the torque delivered to shaft 2 by the prime mover. As a result of this movement, trunnions 123 will oscillate, tilting motor angle box 121 in a clock-wise direction in Figure 1. As angle box 121 tilts, the pressure of fluid in the motor cylinders in communication with the high pressure port 64 of the valve member 38 causes reciprocation of the motor pistons exerting pressures on ring 106 the resultant of which will be sufficient to cause rotation of the motor angle box 121, and casing sections 36 and 40 together with the valve member 38 at a speed depending upon the inclination of box 121 from its normal position.

As the parts rotate fluid will be circulated between the pump and the motor, and due to the action of centrifugal force, the heavier liquid will be thrown outward, while the entrained air will collect in the center of the unit. As the rotation proceeds, liquid is forced through pipe 167 in through the conduit 157 of stationary motor shaft 94 under a pressure depending upon the speed of rotation of the driving shaft. As the fluid is forced into the casing pressure is developed therein and the air will be forced out through conduit 157 and orifice 157' of the shaft section 2 into reservoir 5 and escapes to atmosphere. Liquid is continuously supplied to reservoir 5 until all of the air has been forced out of the transmission through the orifice 157' and the reservoir 5 is filled with liquid. Plug 24 is then replaced and the unit is filled with oil or other liquid ready for service.

Springs 134 and 135 of the automatic control device for the motor are so proportioned that while the torque delivered to the driving shaft section is sufficient to overcome the torque demands on the tail shaft, the angle box 121 of the motor will be held in the position shown in Figure 1. In this position of parts no reciprocation of the motor pistons 103 can occur and the pump and motor together with the casing and tail shaft sections will rotate as a unit at the speed of the driven shaft. When, however, the torque demands on the tail shaft are greater than can be overcome directly by the torque delivered from the driving shaft, the fluid pressures in the circulating system will increase to the point where springs 134 and 135 will yield, causing the angle box 121 to tilt and this in turn causes reciprocation of the motor pistons. The speed of rotation of the casing together with the valve member 38 and pump angle box 147 will then drop below that of the driving shaft 2 an amount depending upon the angular position of box 121, and a relative movement of the pump parts and pumping of fluid occurs which causes reciprocation of the motor pistons. The reciprocation of the motor pistons applies an increased driving force or torque to casing section 40 as above set forth, which aids the drag of the pumping unit on casing section 36 to supply the torque demands on the tail shaft. As the torque demands on the tail shaft vary the fluid pressures developed in the system and the angularity of motor angle box will vary automatically so that the proper amount of power will be diverted through the hydraulic torque multiplying and speed reducing mechanism to handle the load at the tail shaft.

It is to be noted that pumping of the fluid from the reservoir 5 through pipes 19 and 167 into the central part of the casing is continuous so that throughout the operation of the device the casing will be filled with fluid under pressure and any air which may leak into the system collects at the center of the device. As the fluid is forced through the system any air present and hot operating fluid is continuously forced out through the fixed orifice 157' and the air rises through the fluid in the reservoir 5, escaping through outlet 25 in the filling plug 24. In this way the system is kept free from air and the formation of emulsion, and at the same time the operating fluid is continually changing, cooled and filtered, and returned to the transmission system. It is also to be noted that a positive pressure is maintained in operation within the casing and on the suction side of the pumping unit. This pressure owing to discharge of fluid from the transmission through the fixed orifice 157', increases with the speed of operation of the driving shaft 2, and insures the picking up of fluid by the pumping unit at considerably higher speeds and shorter strokes than it has been heretofore possible to operate pumps of the type disclosed. In this manner transmissions adapted for high speed operation in transmitting power from internal combustion engines is provided. It is furthermore to be noted that inlet openings 78 for the suction side of the system are located in valve section 38 outside of the pump cylinder block insuring that fluid will be drawn into the power circulating system outside of the zone where entrained air collects in operation of the device. In this way once the system has been filled, entrained air is eliminated from the power circulating system.

It will be obvious to those skilled in the art that where a fixed torque multiplication and speed reduction is desired, pump angle box 147 may be fixed at the position shown in Figure 1. In this case when the motor angle box is in a full line position shown in Figure 1, no torque multiplication occurs and the tail shaft section 179 will rotate at the same speed as the driving shaft section 2 and no pumping of fluid will occur. When the torque demands on the tail shaft require the maximum torque multiplication, the fluid pressure will increase in the system and motor angle box 121 will tilt towards the position indicated by the line II in Figure 1. When the vertical center of the motor trunnions 123 is moved to line I—I in Figure 1, the angle of the motor angle box 121 will be along the angle indicated by the line II—II in Figure 1, and the mechanism will be operated at its maximum torque multiplying position where maximum pumping of fluid occurs.

In operation, in the position of parts shown, fluid pressure in the system forces plunger 56 against the first locking notch 55 in the actuating extension 53 locking the pump angle plate 147 in its position of maximum angularity to which position the transmission is set under normal operating conditions. In operation of a motor vehicle for which the form shown is specially designed, it is frequently desirable to disconnect or declutch the driving shaft from the driven shaft as for example when brakes are to be applied. In such cases the shaft 29, which may be connected to the clutch pedal of a motor vehicle by a suitable linkage, together with arm 30 is rotated in a clockwise direction, shifting the driving shaft section 2 to the left in Figure 1. After a slight initial movement of the shaft 2, collar 153 secured to extension 152 thereof engages the pump cylinder block 136 and further movement of the shaft separates the timing face of the pump cylinder block from the valve timing face 74 of the valve member 38, connecting the pump ports with the fluid in the casing section 36 so that no fluid pressure is developed in the system, the motor angle plate will move to the position shown in Figure 1, and the driving relation between the driving shaft and tail shaft is broken. It is to be noted that the areas of the ports 64 and 65 and the valve member 38 and the relative areas of ports in both the pump and motor units are such that in operation of the device, only a slight overbalance of pressure exists tending to hold the motor and pump cylinder blocks against the valve faces so that to de-clutch the device a relatively small longitudinal force only need be applied to unseat the pump cylinder block. As the shaft section 2 together with the pump cylinder block shifts to the left in Figure 1, backing plate 147 together with the ring 142, and its universal drive connection and the pump piston rods and pistons will remain stationary as the slots 144 in yoke 145 of the drive shaft section slide on the trunnion blocks 143 compressing spring 154. When shaft 29 is released, spring 154 will return the parts to the position shown in Figure 1, fluid pressures will again be developed in the system, and the motor angle box will assume the proper position in accordance with the torque demands on the tail shaft.

It is advantageous in motor vehicles to provide abnormal torque multiplication to meet adverse operating conditions. In the form of invention shown in Figure 1, when it is desired to increase the torque multiplication ratio over the normal maximum, the declutching device is operated to unseat the pump cylinder block and to release the fluid pressure back of plunger 56. Shift rod 28 may be actuated to shift sleeve 44 together with the actuating member 52 and its extension 53 to the left in Figure 1 until the end of plunger 56 registers with the second V-shaped notch 55 on the extension 53. This movement of parts tilts the pump angle box 147 and the parts supported thereby so that the center line III—III moves from the position shown to the position indicated by the line IV—IV. The pump cylinder block is then permitted to seat against the valve 38 and the fluid pressures build up forcing plunger 56 into locking engagement with the second notch in extension 53. It will be noted that the shift lever 28 is utilized merely to shift the pump angle box when the pressure in the system is released so that shifting is relatively easy and that in operation angle plate 147 is held in position by the extension 53 which is hydraulically locked so that all strain is relieved from the shift lever 28 and sleeve 44. In this position of parts, due to the increased pressure that will be exerted on the piston rods by a given torque delivered at the driving shaft, the fluid operating pressures will be substantially increased and a considerable increase in ratio of torque multiplication between the driving shaft and driven shaft is secured.

When it is desired to place the transmission in neutral condition, the cylinder block 136 is unseated, declutching the system, and lever 28 is shifted to bring the angle box 147 to a vertical position indicated by the center line V—V in Figure 1. In this position of parts the plunger 56 will register with the third V-shaped notch 55 of extension 53, no reciprocation of pump pistons and accordingly no pumping action will occur, and a complete disconnection between the driving shaft and the driven shaft is effected.

When it is desired to reverse the relative rotation of the driving shaft and the tail shaft, the pump cylinder block is unseated declutching the device, the angle box of the pump is shifted to the position indicated by the line VI—VI in Figure 1, and the pump cylinders are then permitted to seat. In this position of parts the port 64 will become the low pressure port and the port 65 of a valve member will become the high pressure port. As a result the direction of rotation of the motor angle box 121 will be opposite to the direction of rotation of the driving shaft 2 and direction of rotation of the casing and tail shaft 179 will accordingly be reversed.

It is to be noted that while only two positions of the pump angle box 147 for forward running has been disclosed, the number of positions may obviously be increased by elimination of notches and providing a friction shoe lock which would result in corresponding variations in obtaining maximum pressures and torque multiplication.

Instead of using a manual control for varying the angularity of the pump unit as shown in Figure 1 to meet abnormal torque demands, this may be done automatically by the mechanism shown in Figure 13. In this form of the invention the trunnions 148 for the pump angle plate 147 are journaled for rotation in blocks 225 which are slidably supported in slots or guide-ways 226 formed in the casing section 36. Formed in the end of trunnions 148 are slots 227 in which blocks 228 slidably fit. Blocks 228 are journaled on spindles 229 which are formed integrally with cover plates (not shown), and are secured to the casing by means of bolts or studs 230. This general arrangement is similar to that of Figure 4. The sliding blocks 225 abut against the ends of arched leaf springs 231, the centers of which rest against the centers of arched leaf springs 232, the ends of which abut against adjusting blocks 233. Block 233 abut against the ends of adjusting screws 234 threaded into suitable projections of casing section 36. Threaded over the ends of the adjusting screws 234 are the protecting caps 235. The tension of springs 231 and 232 is predetermined so that the blocks 225 will be held in the position shown in Figure 13 under normal operating conditions, this being its position of maximum angularity as indicated by the line VII—VII in Figure 13. When the torque demands on the tail shaft are such that they cannot be met by the motor angle box in its position of maximum angularity, the fluid pressures in the system will rise to the point where the reactions against the pump angle box 147 will cause springs 231 and 232 to yield permitting the blocks 225 together with the trunnions 148 to shift to the left in Figure 13. This will cause tilting of the angle box in a counter-clockwise direction from the position indicated by line VII—VII towards the position indicated by the line VIII—VIII in Figure 13, decreasing the angularity of the pump backing plate 147 and increasing the pressures developed at the torque multiplication to meet the demands on the tail shaft. If desired the angularity of the pump angle box may be permitted to reduce until a complete disconnection of the driving and driven shaft occurs as the pressures increase or the motion of the pump angle plate may be limited so that complete disconnection cannot occur. In this way it will be seen that under ordinary operating conditions the pump backing plate will remain at its position of maximum angularity and the system will operate at relatively normal maximum pressure, while under abnormal conditions the maximum fluid pressure will be increased to meet the increased torque demands. As soon as the load on the tail shaft is reduced the pump will return to its position of maximum angularity and the mechanism will operate at the normal pressures.

In operation of a motor vehicle, it may at times become desirable to establish a fixed reduction of speed between the driving and tail shafts independently of the fluid pressures developed by modifying the motor as shown in Figure 14 of the drawings. In this form of device the trunnions 112 of the universal joint between the stationary motor shaft 94 and the motor ring 106 are journaled for rotational movement only in the yokes 116 of the stationary shaft 94, and supporting section 158 of the stationary shaft 94 is cylindrical in shape and slidably splined or keyed in the stationary supporting seat 159. Rigidly secured to the projecting end of the stationary member 94 is an actuating collar member 241 which is engaged by a pair of shifting arms 242 secured to a sleeve 243 which in turn is keyed to an actuating shaft 244, journaled in suitable bearings formed in the rear casing section 163. The shaft 244 is preferably actuated by a brake lever to shift the member 94 and angle box 121 as will more fully hereinafter appear. Secured to the end of the casing section 163 is a cap 245 in which a coupling member 246 is secured which fits slidably into a recess formed in the end of the stationary member 94 and provides a communicating duct between the pipe 167 from the filter unit and the duct 157 for admission of fluid into the casing. Collar member 100 for holding the motor parts in assembled relation on the stationary shaft 94 is spaced away from the motor cylinder block as indicated to permit a sliding movement of the shaft 94 to the right sufficient to cause tilting of the motor backing or angle box 121 from the position shown to its position of maximum angularity indicated by the line II—II. Otherwise the motor unit is the same in construction as set forth in connection with Figure 1, and a reference may be had to the description above given for the remaining details thereof.

When this type of motor is utilized, by actuating the shaft 244 to shift the stationary shaft 94 together with the parts supported to the right in Figure 1, the motor backing plate may be shifted so that its vertical center moves to the line I—I, and as the spindles 128 (Figure 7) are fixed to the casing, this movement will force trunnions 123 to the right and will cause tilting of the motor angle block towards the position indicated by the line II—II. The amount of tilting of the motor angle box toward the line II—II will be determined by the extent of movement of shaft 94 and of actuation of the shaft 244, and will occur independently of pressures developed in the system. In this way the motor angle box may be tilted to any desired degree of angularity, and when the wheels of a motor vehicle are driving the casing of the mechanism as occurs when coasting or going down a grade, the motor will pump fluid and develop pressures in the system tending to drive the pump unit, as a result the tail shaft will be retarded and the engine compression may be utilized to produce a variable braking effect on the tail shaft.

In the form of invention shown in Figure 14, the automatic form of control shown in Figure 13 has been disclosed for operating the pumping unit, but it will be understood that a manual control may also be utilized as shown in Figure 1. Also if it is found desirable to eliminate the friction of the motor face during any period of operation the nut 100 can be so located as to make it possible for shaft 94 to move the valve faces apart.

Instead of taking off the driving power from an extension of the casing section 40, the driving power may obviously be taken off at any point on the casing. As shown in Figure 14, a modified gearing arrangement is provided for driving my improved transmission unit and deriving power therefrom in which casing section 36 is provided with a tubular extension 247 which extends through the bearing 34 into a gear box 248 which replaces casing 5 in the form of invention shown in Figure 1, and in which the bearing 34 is supported. Keyed to the tubular extension 247 is a final drive gear 249. Extension 247 is supported beyond the gear 249 in the ball bearing 250 which is supported on cross member 251 of the casing section 248 and a locking collar 252 is provided on the end of extension 247. The driving shaft section 2 in this form of invention is journaled in a bushing 253 secured in the extension 247 of casing section 36 and is provided with a splined section 254 on which the driving gear 255 is slidably keyed. Driving gear 255 is provided with a hub section 256 which is journaled for rotation in the ball bearings 257 supported from the casing 248. Formed integrally with the splined section 254 of the driving shaft 2 is a section 258 which extends into a storage reservoir 259 of the casing section 248 through a stuffing box 260. Secured on the end of the driving shaft section 258 by means of a collar 261 is a bearing member 262 engaged by the ends of the declutching arms 30 which are actuated by the declutching shaft 29 as above set forth. A suitable filling section 263 for the casing section 259 is provided which is closed by a filling plug 264 provided with air outlet 265. The conduit 157 of the driving shaft section 2 in this form of the invention is extended to the end of the driving shaft section 258 and is closed with a plug 265 in which the discharge orifice 157' is formed. Oil from the casing section 259 in this form of the invention is drawn by a gear pump driven by the prime mover from the reservoir 259 and is forced through the filtering and cooling device under pressure through the connection 246 into the conduit 157 of motor shaft 94.

The remaining details of the form of invention shown in Figure 14 are similar to those shown in Figure 1, and will be fully understood by reference to the description thereof hereinbefore given. In operation of the device, the driving shaft section 2 is driven by gear 255 and suitable gearing from the prime mover and the driven shaft is driven from casing section 36 through the gear 249 and suitable gearing. To declutch this form of device shaft 29 is actuated to shift shaft section 2 bodily endwise and to unseat the pump cylinder block 136. By actuating the shaft 244 to shift the stationary motor member 94 to the right in Figure 14, the motor angle box may be held tilted independently of the automatic control device and the pressures developed in the system, so that the transmission may be utilized to establish a fixed gear ratio between the prime mover and the driven shaft independently of the torque demands on the tail shaft and may accordingly be used for braking purposes in a motor vehicle.

While the gears 249 and 255 of the form of invention shown in Figure 14 may be connected in any suitable manner to a prime mover and to a driven shaft, a preferred arrangement of gearing for this purpose is shown in Figures 15 to 19, in which provision is made for effecting a complete disconnection of the transmission unit from the driving and driven shafts and mechanically coupling the driving to the driven shaft. As shown the casing 248 is extended around gears 270 and 271 which mesh with the gears 249 and 255. Gears 270 and 271 have formed integrally therewith tubular supporting extensions 272 which are journaled in anti-friction bearings 273, in turn supported by the brackets 274 from the casing 248. Rigidly secured to the gears 270 and 271 by means of securing rivets 275, or in any other suitable manner, are cover plates 276 provided with the tubular extensions 277 which are supported for rotation in the anti-friction bearings 278 in turn supported from the casing section 248 by the brackets 279. Secured in position by the cover plates 276 within recesses formed in the gears 270 and 271 are the disks of friction material 280 for example asbestos lining, between which the metallic friction disks 281 are positioned. Disks 280 and 281 are held yieldingly in engagement by the helical springs 282 and adjusting screws 283 are provided to vary the compression of the springs 282. Formed on the friction disks 281 are the internal teeth 283' and formed on the interior of the gears 270 and 271 are internal teeth 284. Teeth 283' and 284 are adapted to be engaged by and mesh with external teeth 285 of the coupling sleeves 286. Sleeves 286 are journaled for rotation in bushings 287 rigidly secured in the extensions 272 of gears 270 and 271, and are slidably splined on the fluted sections of the driving shaft 288 and driven shaft 289. Shafts 288 and 289 are journaled in anti-friction bearings 290 which are supported in extensions of the casing section 248 and secured to these shafts are the coupling members 291 and 292. Formed on the forward inner end faces of the sleeves 286 are the clutch teeth 292 (Figure 19) which mesh with each other in the inner position of the sleeves and establish a mechanical connection between shafts 288 and 289. Secured in position on the outer ends of the sleeves 286 by means of locking collars 293 are the shifting members 294, in the annular grooves of which lower ends of shifting arms 295 are nested. The upper ends of arms 295 are secured to and movable with the rods 296 and 297 which are supported for sliding movement in suitable seats or guideways in top section 263 of casing 248. Rods 296 and 297 are connected for simultaneous movement in opposite directions by a connecting link 298 which is pivoted at its center by means of a pivot pin 299 from a suitable projection of the casing section 263. Rod 297 extends out through the casing section 263 and is actuated by any suitable control means such for example as a shift lever. On its upper surface rod 297 is provided with three V-shaped locking notches into which the V-shaped end of plunger 300, seated in a suitable recess in the casing section 263 is forced by the action of a helical spring 301. These notches are positioned so that the first one registers with plunger 300 when the teeth 292 of the sleeves 286 are in engagement as shown, the second registers when teeth 285 of the sleeve 286 engage teeth 283' of the disk 281, and the third registers when teeth 285 of sleeves 286 engage teeth 284 of the gears 270 and 271 respectively. Plunger 300 and the notches coacting therewith serve to locate the positions of sleeve 286 and these give an indication to an operator of the various positions thereof.

Formed on the end of the tubular extension 272 of the gear 271 is a spiral gear 302 which meshes with and drives a spiral gear 303 in turn keyed to and driving the shaft 304. Shaft 304 is journaled in a cap 305 of the casing section 248 and secured to its opposite end by a key 307 is gear 306 of a gear pump which meshes with a coacting gear (not shown). The suction side of the pump gears is connected in any conventional manner with the fluid in the storage reservoir 259 and the pump gears force the fluid through the filtering and cooling device under pressure into the coupling member 246 of the transmission unit shown in Figure 14.

In operation of the gearing arrangement shown in Figures 15 to 19, with the parts as shown in Figure 15, driving shaft section 288 is mechanically connected through sleeves 286 and clutch teeth 292 to tail shaft section 289 and the mechanism is in direct couple. Sleeves 286 will rotate in extensions 272 of gears 270 and 271 so that gears 270 and 271 and gears 249 and 255 of the torque multiplying mechanism will remain at rest while the tail shaft will rotate with the driven shaft. When it is desired to break the direct connection between the driving shaft section 288 and the tail shaft section 289 and to transmit power through the torque multiplying mechanism the declutching device is operated as above set forth or the mechanism is thrown into neutral position, and rod 297 is shifted to move sleeves 286 outward. As the sleeves 286 separate, teeth 292 disengage, breaking the connection between the driving shaft and the tail shaft and when the end of plunger 300 drops into the next notch of rod 297 teeth 285 of the sleeves 286 mesh with teeth 283' of disks 281 rotating these disks with the shafts 288 and 289 respectively. With the transmission mechanism in neutral rotation of disks 281 will drive the gears 270 and 271 through friction disks 280. Gears 270 and 271 will drive the gears 249 and 255 bringing the transmission parts up to the proper operating speeds without undue shock. After the transmission parts are in rotation rod 297 is again shifted until plunger 300 seats in the next notch causing further separating movement of the sleeves 286 and meshes teeth 285 with teeth 284 of gears 270 and 271. Gears 270 and 271 will then be mechanically coupled with the driven and driving shafts and the transmission parts will now be in rotation, without, however, developing pressures in the hydraulic system. After the gears 270 and 271 have been mechanically coupled to the driven and driving shaft respectively, the torque multiplying transmission is shifted from its neutral or declutched position to a position where pressures will be developed and power will then be transmitted through the torque multiplying system. When the torque demands on the tail shaft are such that they can be handled directly by the prime mover, as above set forth, the tail shaft 289 will be rotating substantially at the speed of the driving shaft 288. Under these conditions arms 295 may be actuated to shift sleeves 286 inward to the position shown in Figure 15. The torque multiplying mechanism will then come to rest and the driving shaft will be mechanically coupled to the tail shaft. In this way it will be seen that a novel gear arrangement is provided through which the torque multiplying transmission mechanism may be connected at will between the driving and driven shafts by a simple shifting operation, and the torque multiplying mechanism may be kept at rest while the prime mover can deliver sufficient torque to handle the load on the tail shaft.

While a hydraulic transmission with an automatically controlled pumping unit has been disclosed in connection with the gearing shown in Figure 15, it will be obvious to those skilled in the art that the form of transmission heretofore disclosed with the manually controlled pump may be utilized therewith, and also that the gearing is applicable to various types of hydraulic, electrical and mechanical transmissions and is not limited to the particular form disclosed. For example, an electrical generator driven by the gear 255 may deliver energy to an electrical motor driving the gear 249 for the purposes of torque multiplication. It will be obvious to those skilled in the art that my improved combinations and sub-combinations are not limited in use to the particular relation shown, but are applicable in numerous independent relations. Accordingly, what is desired to be secured by Letters Patent and claimed as new is:

1. A hydraulic transmission comprising a casing; a valve member dividing said casing into two compartments; a pump disposed in one of said compartments; a driving shaft connected to said pump; a motor disposed in the other of said compartments actuating a driven shaft; a fluid passage in said valve member connecting said compartments; a fixed fluid discharge orifice for one of said compartments; a fluid inlet orifice for the other of said compartments; and means for forcing fluid through said inlet orifice into said casing.

2. The combination as set forth in claim 1 in which said last mentioned means comprises a pump driven by said driving shaft delivering fluid to said casing under positive pressures which vary with the speed of rotation of said driving shaft.

3. In a hydraulic transmission the subcombination of a rotatable valve member; high and low pressure fluid ports through said valve member; a fluid intake and outlet passage for each of said ports; and control valves for said ports in said passages actuated by the high pressure fluid in said ports to open the control valve for the low pressure port and to close the control valve for the high pressure port.

4. In combination a cylinder block; a plurality of parallel cylinders in said block; means for admitting fluid to said cylinders; a plurality of reciprocating pistons in said cylinders; an angle plate; a piston rod connecting each piston with said angle plate; an angle box supporting said angle plate; a pair of trunnions secured to said angle box; slidably supported journal members for said trunnions; and means for causing rotation of said trunnions in said journal members during sliding movements of said journal members.

5. The combination as set forth in claim 4 together with means controlled by the fluid pressures in said cylinders for controlling the movement of said journaled members.

6. The combination as set forth in claim 4 together with resilient means yieldingly controlling the movement of said journal blocks.

7. A fluid operated power transmission comprising a driving member; a driven member; a rotary casing driving said driven member; a variable capacity fluid motor with non-rotatable cylinders disposed within and actuating said casing; a fluid pump comprising an element reacting against and tending to rotate said casing and a co-acting pump element driven by said driving member; a stationary fluid reservoir; and means continuously forcing fluid from said reservoir into said casing during power transmitting operation.

8. A hydraulic transmission comprising a driving member; a driven member; a rotary casing driving said driven member; a variable capacity fluid motor comprising non-rotatable cylinders disposed within and actuating said casing; a fluid pump comprising an element reacting against and tending to rotate said casing and a co-acting pump element driven by said driving member; a stationary fluid reservoir communicating with atmosphere; fluid filtering and cooling means; and means for continuously removing operating liquid and gas from said casing to said reservoir to permit said gas to separate from said operating fluid and forcing said operating liquid through said filtering and cooling means into said rotary casing under pressure.

9. A hydraulic transmission comprising a driving member; a driven member; a rotatable valve member comprising pump and motor timing faces, a rotatable casing divided into separate pump and motor compartments by said valve member and driving said driven member, a pump disposed in said pump compartment actuated by said driving member;

a motor disposed in said motor compartment actuating said casing; timing ports in said valve member extending between said timing faces and connecting said pump and said motor; and fluid inlet and outlet passages from said ports to said pump compartment at points outside of said pump timing face.

10. The combination as set forth in claim 9, together with control valves for said inlet and outlet passages opened by fluid pressures developed in the high pressure port of said valve member.

11. A hydraulic transmission comprising a driving member; a driven member; a rotatable valve member comprising pump and motor timing faces; a rotatable casing divided into separate pump and motor compartments by said valve member and driving said driven member; a pump disposed in said pump compartment actuated by said driving member; a motor disposed in said motor compartment actuating said casing; timing ports in said valve member extending between said timing faces and connecting said pump and said motor; fluid inlet and outlet passages from said ports to said pump compartment at points outside of said pump timing face; and control valves for said inlet and outlet passages seated by centrifugal force and fluid pressures and unseated by fluid pressures developed in the high pressure port of said valve member.

12. In a hydraulic transmission, the subcombination of a valve member; fluid ports through said valve member; a fluid passage communicating with each of said ports; an independent fluid control valve in each of said passages; fluid pressure responsive means for actuating each of said control valves; and a communicating passage from each of said ports to said valve operating means for the valve individual to the other of said ports whereby high fluid pressures in either of said ports causes the opening of the valve for the other of said ports.

13. In a hydraulic transmission, the subcombination of a valve member; fluid ports through said valve member; a fluid passage communicating with each of said ports; control valves in each of said passages; independent pressure responsive means actuating each of said control valves; and a communicating passage from each of said ports to the valve actuating means controlling the other of said ports.

14. In a hydraulic transmission, the subcombination of a valve member; fluid ports extending through said valve member; a fluid intake and outlet passage individual to each of said ports; independent control valves for said ports in said passages; and independent means directly actuated by fluid pressures in each of said ports for opening the control valve individual to the other of said ports.

15. A torque multiplying hydraulic transmission comprising driving means; driven means; a variable capacity pump actuated by the relative rotation of said driving and said driven means comprising a plurality of rotatable cylinders; means responsive to variations in the operation of said pump for varying the capacity thereof; a motor driving said driven means; and means for distributing fluid between said pump and said motor.

16. A torque multiplying transmission apparatus embodying a driving member; a driven member; a variable capacity fluid pump comprising an element actuated by said driving member and a complemental element operatively connected to said driven member; one of said elements being provided with a plurality of recesses receiving fluid in operation of the apparatus and the other of said elements comprises members fitting into and expelling fluid from said recesses in operation of the apparatus; means for varying the capacity of said pump in response to variations in operation of said pump; a fluid motor comprising reciprocating members driving said driven member; and fluid passages between said pump and said motor.

17. The combination as set forth in claim 16 in which said motor is of variable volumetric capacity together with means for varying said capacity.

18. A torque multiplying transmission apparatus embodying a driving member; a driven member; a variable capacity rotary fluid pump comprising complemental elements actuated by the difference in rotation of said members, one of said elements comprising a plurality of recesses receiving fluid in operation of the apparatus, another of said elements comprising members fitting into and expelling fluid from said recesses in operation of the apparatus; a fluid motor comprising rotary reciprocating means driving said driven member; means for distributing the fluid between said pump and said motor; and means for varying the capacity of said pump in accordance with variations in operation of said pump.

19. The combination as set forth in claim 18 in which said last mentioned means comprises means responsive to the fluid pressures developed by said pump to vary the capacity of said pump.

20. A torque multiplying transmission apparatus embodying a driving member; a driven member; a variable fluid pump comprising an element actuated by said driving member and a complemental element operatively connected to said driven member, one of said elements being provided with a plurality of rotatable reciprocable members coacting with the other of said elements to pump fluid in operation of the apparatus; a fluid motor comprising reciprocating members driving said driven member; fluid passages between said pump and said motor; and means responsive to variations in the relative speeds of operation of such pump elements for varying the capacity of said pump.

21. The combination as set forth in claim 20 in which said motor is of variable volumetric capacity together with means for varying said capacity.

22. A torque multiplying transmission apparatus embodying a driving member; a driven member; a variable capacity rotary fluid pump comprising complemental elements; one of said elements being concentric with and connected to said driving member and provided with a plurality of rotatable reciprocable elements and coacting with the other of said elements to pump fluid in operation of the apparatus; a fluid motor comprising rotary reciprocating means driving said driven member; means for distributing the fluid between said pump and said motor; and means responsive to variations in the speed of operation of one of said pump elements relative to said driven member for varying the capacity of said pump.

23. A torque multiplying hydraulic transmission comprising driving means; driven means; a pump actuated by the relative rotation of said driving and said driven means comprising a plurality of rotatable reciprocable members operative to pump fluid; means for varying the capacity of said pump in accordance with variations in operation of said pump; a motor comprising a plurality of reciprocable members driving said driven means; and means for distributing fluid between said pump and said motor.

24. A torque multiplying hydraulic transmission comprising driving means; driven means; a variable capacity pump actuated by the relative rotation of said driving and said driven means; means responsive to variations in the operation of said pump for varying the capacity thereof; a motor driving said driven means; and means for distributing fluid between said pump and said motor.

25. A torque multiplying hydraulic transmission comprising driving means; driven means; a variable capacity pump actuated by the relative rotation of said driving and said driven means; means responsive to variations in the operation of said pump for varying the capacity thereof; manually operable means designed to control said responsive means for varying the capacity of said pump; a motor driving said driven means; and means for distributing fluid between said pump and said motor.

26. A torque multiplying hydraulic transmission comprising driving means; driven means; a variable capacity pump actuated by the relative rotation of said driving and said driven means; means responsive to pressure developed by said pump for varying the capacity of said pump; a motor driving said driven means; and means for distributing fluid between said pump and said motor.

27. A torque multiplying transmission apparatus embodying a driving member; a driven member; a variable capacity rotary fluid pump comprising complemental elements actuated by the difference in rotation of said members, one of said elements comprising a plurality of recesses receiving fluid in operation of the apparatus, another of said elements comprising members fitting into and expelling fluid from said recesses in operation of the apparatus; a fluid motor comprising rotary reciprocating means driving said driven member; means for distributing the fluid between said pump and said motor; and means for shifting said driving member and said pump elements with relation to said distributing means to prevent the development of fluid pressures by said pump.

28. A torque multiplying transmission apparatus embodying a driving member; a driven member; a fluid pump comprising an element actuated by said driving member and a complemental element operatively connected to said driven member, one of said elements being provided with a plurality of rotatable reciprocable members coacting with the other of said elements to pump fluid in operation of the apparatus; a fluid motor comprising reciprocating members driving said driven member; fluid passages between said pump and said motor; and means for shifting said driving member and said pump elements simultaneously to prevent the development of fluid pressures by said pump elements.

29. A torque multiplying hydraulic transmission comprising a driving shaft, a fluid pump actuated by said driving shaft embodying a plurality of pump cylinders; fluid ports in the end of said pump cylinders; a valve member common to and controlling said ports against which the ends of said cylinders are held seated by the fluid pressures developed in said cylinders; a driven member by its rotation actuating elements of said pump; a fluid motor driving said driven member; and means for shifting said driving shaft endwise to unseat said pump cylinders with relation to said valve member.

30. A torque multiplying hydraulic transmission comprising driving means; driven means; a hydraulic motor; a pump actuated by the relative rotation of said driving and said driven means, said pump including means providing fluid inlet and outlet ports; fluid distributing means between said pump and said motor against which said pump ports are seated in operation; and means for shifting said driving means and said pump endwise to unseat said pump ports with relation to said fluid distributing means.

31. The combination as set forth in claim 30 in which said last mentioned means comprises mechanism to reduce the volumetric capacity of said pump to zero before unseating of said pump ports occurs.

32. A torque multiplying hydraulic transmission comprising driving means; driven means; a variable capacity pump actuated by said driving means; means for varying the capacity of said pump; means responsive to fluid pressures developed in the operation of said pump for mechanically locking said last mentioned means against movement; a motor driving said driven means; and means for distributing fluid between said pump and said motor.

33. A torque multiplying transmission apparatus embodying a driving member; a driven member; a variable capacity fluid pump comprising an element actuated by said driving member and a complemental element operatively connected to said driven member; one of said elements being provided with a plurality of recesses receiving fluid in operation of the apparatus and the other of said elements comprising members fitting into and expelling fluid from said recesses in operation of the apparatus; means for varying the capacity of said pump; means responsive to fluid pressures to lock said last mentioned means in any one of a plurality of positions; a fluid motor comprising reciprocating members driving said driven member; and fluid passages between said pump and said motor.

34. The combination as set forth in claim 33 in which said motor is of variable volumetric capacity together with means for varying said capacity.

35. A torque multiplying transmission apparatus embodying a driving member; a driven member; a variable capacity rotary fluid pump comprising complemental elements actuated by the difference in rotation of said members, one of said elements comprising a plurality of recesses receiving fluid in operation of the apparatus, another of said elements comprising members fitting into and expelling fluid from said recesses in operation of the apparatus; a fluid motor comprising rotary reciprocating means driving said driven member; means for distributing the fluid between said pump and said motor; means for varying the capacity of said pump; and means responsive to the fluid pressures developed by said pump to prevent operation of said last mentioned means.

In testimony whereof I affix my signature.

ALDEN G. RAYBURN.